US012674681B1

(12) United States Patent
Bosse et al.

(10) Patent No.: US 12,674,681 B1
(45) Date of Patent: Jul. 7, 2026

(54) POSE GRAPH DOWNSAMPLING

(71) Applicant: Zoox, Inc., Foster City, CA (US)

(72) Inventors: Michael Carsten Bosse, Templeton, CA (US); Jeffrey Eric Tolliver, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 176 days.

(21) Appl. No.: 17/970,856

(22) Filed: Oct. 21, 2022

(51) Int. Cl.
*G01C 21/00* (2006.01)
*B60W 60/00* (2020.01)

(52) U.S. Cl.
CPC ....... *G01C 21/3807* (2020.08); *B60W 60/001* (2020.02); *G01C 21/3833* (2020.08); *G01C 21/3889* (2020.08); *B60W 2420/408* (2024.01); *B60W 2556/50* (2020.02)

(58) Field of Classification Search
CPC ............ G01C 21/3807; G01C 21/3889; G01C 21/3833; B60W 60/001; B60W 2556/50; B60W 2420/408
USPC ........................................................ 701/450
See application file for complete search history.

(56) References Cited

U.S. PATENT DOCUMENTS

| | | | | |
|---|---|---|---|---|
| 8,412,239 B1 * | 4/2013 | Palanki | ................. | H04W 4/025 |
| | | | | 455/11.1 |
| 9,971,352 B1 * | 5/2018 | Mudalige | ............. | G05D 1/0077 |
| 10,013,508 B2 * | 7/2018 | Joshi | .................. | G01C 21/3867 |
| 2013/0287279 A1 * | 10/2013 | Roessl | .................. | G06T 11/003 |
| | | | | 382/131 |

| | | | | |
|---|---|---|---|---|
| 2016/0327395 A1 * | 11/2016 | Roumeliotis | ............. | G06T 7/20 |
| 2018/0304891 A1 * | 10/2018 | Heidenreich | ...... | G01C 21/3602 |
| 2019/0147331 A1 * | 5/2019 | Arditi | .................. | G06N 3/0475 |
| | | | | 706/20 |
| 2020/0364901 A1 * | 11/2020 | Choudhuri | .............. | G06F 3/005 |
| 2021/0031891 A1 * | 2/2021 | Englot | .................. | B63G 8/001 |

(Continued)

FOREIGN PATENT DOCUMENTS

WO       WO-2020048623 A1 *   3/2020   ............. G01C 21/26

OTHER PUBLICATIONS

Dellaert, "Factor Graphs and GTSAM: A Hands-on Introduction", Sep. 2012, Georgia Institute of Technology (Year: 2012).*

(Continued)

*Primary Examiner* — Ramya P Burgess
*Assistant Examiner* — Preston Jay Miller
(74) *Attorney, Agent, or Firm* — EIP US LLP

(57) ABSTRACT

Determining a first joint probability distribution over states of a sensor platform, the first joint probability distribution associated with a first sequence of time steps. Receiving sensor data indicating measurements at time steps of a second sequence of time steps. Integrating out variables from the first joint probability distribution to determine a second joint probability distribution over poses of the sensor platform, the second joint probability distribution associated with the second sequence of time steps. Determining, using the second joint probability distribution, parameters of a third joint probability distribution, the third joint probability distribution being characterized by unary factors for time steps of the second sequence of time steps and binary factors for pairs of neighboring time steps of the second sequence of time steps. Estimating, using the sensor data and the third joint probability distribution, poses of the sensor platform associated with the second sequence of time steps.

11 Claims, 7 Drawing Sheets

(56)                    References Cited

U.S. PATENT DOCUMENTS

| | | | |
|---|---|---|---|
| 2021/0063200 A1* | 3/2021 | Kroepfl ................... | G06N 3/02 |
| 2021/0245777 A1* | 8/2021 | Mori ................... | B60W 60/001 |
| 2022/0026920 A1* | 1/2022 | Ebrahimi Afrouzi .... | G06N 7/01 |
| 2022/0146264 A1* | 5/2022 | Brommer ........... | G01C 21/1656 |
| 2022/0314984 A1* | 10/2022 | Takahashi ............. | B60W 30/12 |
| 2023/0139772 A1* | 5/2023 | Wang ...................... | G06N 3/08 |
| | | | 345/419 |

OTHER PUBLICATIONS

Wikipedia, Kalman Filter, 2021 (Year: 2021).*
Barfoot et al., "Batch Continuous-Time Trajectory Estimation as
Exactly Sparse Gaussian Process Regression", Jul. 14, 2014, Robot-
ics: Science and Systems, Berkeley (Year: 2014).*
Dellaert et al., "Factor Graphs for Robot Perception", 2017, Foun-
dations and Trends® in Robotics vol. 6, No. 1-2 (2017) 1-139 (Year:
2017).*
Carlevaris-Bianco et al. "Generic Node Removal for Factor-Graph
SLAM", 2014, IEEE Transactions on Robotics, vol. 30, No. 6,
1371-1385 (Year: 2014).*
Carlevaris-Bianco et al. "Generic Factor-Based Node Marginaliza-
tion and Edge Sparsification for Pose-Graph SLAM", 2013, 2013
IEEE International Conference on Robotics and Automation (ICRA)
(Year: 2013).*

\* cited by examiner

300

POSE GRAPH DOWNSAMPLING

BACKGROUND

An autonomous vehicle may navigate an environment based at least in part on a map of the environment. To generate the map of the environment, a mapping process may be performed in which a mapping vehicle takes measurements of the environment using sensors such as LIDAR sensors, radar sensors, and/or other imaging sensors, whilst simultaneously capturing data for estimating the position and/or orientation of the mapping vehicle within the environment. The measurements of the environment may be combined using the estimated positions and orientations of the mapping vehicle.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
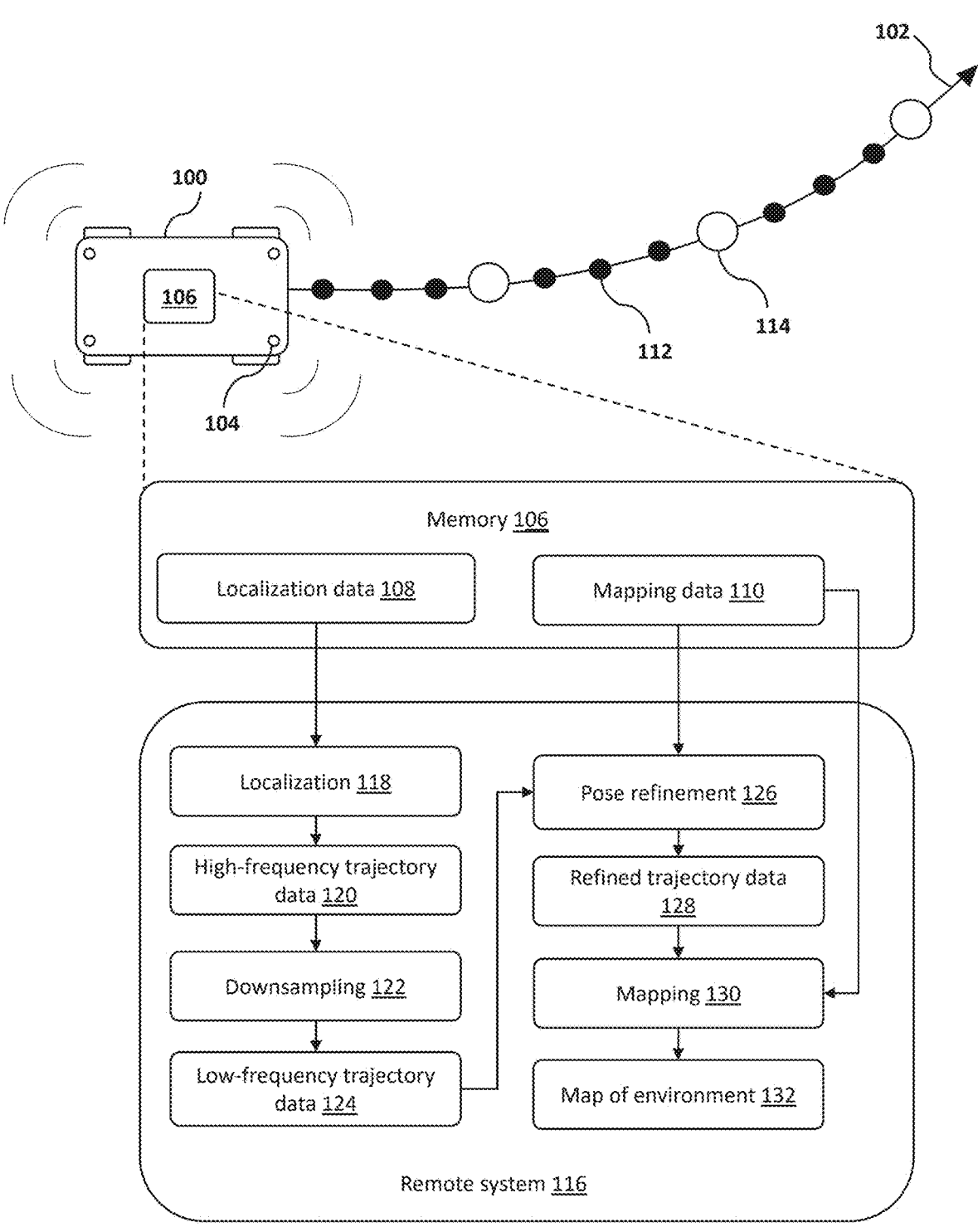
FIG. 1 is a schematic illustration of a mapping vehicle and a computing system configured to generate a map of an environment.

The present disclosure relates to estimating positions and/or orientations of a sensor platform, for example a sensor platform used to capture data for generating a map of an environment. A sensor platform may be any entity capable of moving or being moved within an environment and supporting a sensor or sensors for taking measurements of the environment. Examples of sensor platforms include autonomous vehicles and manually driven vehicles with onboard sensor systems, and handheld or otherwise human-supported sensor devices. A sensor platform may be arranged to take measurements of an environment at regular or irregular intervals, each measurement representing part of the environment in a vicinity of the sensor platform at a given time. For example, a sensor platform may include a LIDAR sensor for taking range measurements from which point cloud representations of the environment can be generated. Additionally, or alternatively, a sensor platform may include an image sensor for generating a visual representation of the environment. Representations of parts of the environment based on measurements taken at different times, potentially by different sensor platforms, may be combined to generate a map of the environment, for example a high-definition (HD) three-dimensional map to be used by an autonomous vehicle to navigate the environment. Data determined from measurements of an environment captured by the sensor platform, and used to generate a map of the environment, may be referred to as mapping data.

In order to generate a map of an environment using mapping data captured by a sensor platform, localization data may be determined for estimating poses (i.e. positions and/or orientations) of the sensor platform at times when the data for mapping is obtained. The localization data may be derived from the same sensor measurements as the mapping data, or a subset thereof, though this is not necessarily the case. More generally, the localization data may be used to estimate states of the sensor platform, which may include values of kinematic variables such as the position and/or orientation of the sensor platform, along with, optionally, time derivatives of these variables, such as velocity and rate of rotation, and potentially other variables such as inertial measurement unit (IMU) bias, drifts, etc. The state may be representable as a vector with components representing respective state variables. In a simplified representation, the vector may for example represent planar (horizontal) position, planar velocity, yaw and yaw rate. Other variables may additionally, or alternatively, be included in the state, such as vertical position, pitch, and/or roll, along with optionally their associated time derivatives. A state of a sensor platform may correspond to a pose of the sensor platform, or a subset of the components of a state may correspond to a pose. Localization data may be determined based on measurements from various onboard sensors of the sensor platform such as LIDAR sensors, radar sensors, image sensors, an IMU—which may comprise various sensors, such as micro-electromechanical system (MEMS) magnetic field sensors, accelerometers, gyroscopes, bolometers, and the like, and/or a global positioning system (GPS) receiver. The measurements may provide information about the state of the sensor platform and a given point in time, and/or may provide odometry information relating a state of the sensor platform at one time to a state of the sensor platform at another time.

To estimate the states of the sensor platform, the localization data (along with associated uncertainty estimates defined by a noise model) may be processed using a filter and/or a smoother, leading to an estimated joint probability distribution over states of the sensor platform at time steps of a sequence of time steps. In the present disclosure, a sequence of time steps may be any ordered sequence of points in time, which may be temporally separated by regular or irregular intervals. In order to obtain accurate estimates of the states of the sensor platform, the sensor platform may capture localization data at a relatively high frequency, for example 100, 200, 500 or 1000 times per second.

Mapping data may contain more detailed or otherwise different information about the environment than localization data. Alternatively, portions of the mapping data may include the same information as portions of the localization data. For example, the localization data may be determined from a series of LIDAR measurements (along with measurements from other sensors) and the mapping data may be determined from a subset of the same LIDAR measurements (and/or other measurements). The process of combining measurements of an environment to generate a map of the environment may be more computationally intensive than process of estimating a position and/or orientation of a sensor platform based on localization data. As a result, mapping data may be determined at a relatively low frequency compared with localization data, for example 1, 5 or 10 times per second.

Aside from being used to generate a map of the environment, mapping data may be used to refine estimates of the position and/or orientation of the sensor platform. This may be possible, for example, because the processing of mapping data may include additional steps that may not be performed during localization, such as detecting loop closures (as discussed in more detail hereinafter). These refined estimates may in turn enable a more accurate map of the environment to be generated. However, because the mapping data is typically determined at a lower frequency than the localization data, this refinement is not straightforward to carry out. In particular, while it is possible to downsample estimates of position and/or orientation derived from the localization data, it is not straightforward to derive a noise model for the downsampled estimates, without which it may not be possible to determine, in a principled and tractable manner, a relative weighting between the mapping data and the downsampled estimates, for use in refining the estimated positions and/or orientations of the sensor platform.

Aspects of the disclosed technology (including but not limited to a method, a system, and one or more non-transitory computer-readable media) enable poses of a sensor platform to be estimated based on sensor data captured by the sensor platform at two different frequencies. For example, poses of the sensor platform may be estimated using localization data determined at a first frequency, and these estimates may be refined using mapping data determined at a second, lower frequency. In this way, the benefits of determining localization data at a high frequency may be combined with the benefits of determining mapping data at a lower frequency, to achieve more accurate estimates of the states of the sensor platform.

The disclosed method includes determining values of a set of parameters of a joint probability distribution over poses of the sensor platform at a desired sequence of time steps. The resulting joint probability distribution is representable by a factor graph (or pose graph) consisting of a unary factor for each time step and a binary factor for each pair of neighboring time steps. A factor graph is a representation of a joint probability distribution over a set of variables and includes a set of nodes representing the variables and a set of nodes representing factors connecting the variables. The connectivity of the graph indicates which variable(s) each of the factors depends on. A factor graph consisting of a unary factor for each time step and a binary factor for each pair of neighboring time steps may be represented by (or otherwise be associated with) a block-diagonal information matrix comprising zeroes at off-diagonal entries associating non-neighboring pairs of time steps, which is a suitable sparsity structure for the joint probability distribution to be combined with pose estimates derived from the mapping data, as explained in more detail hereinafter.

In the following paragraphs, the term pose may be used to refer to a position and/or orientation of an object. The position of an object may be defined with reference to a global or local coordinate system, and may be defined for example by a vector in two or three dimensions. The orientation of an object may refer to a rotation from a default orientation about one or more axes. The orientation may be represented by a rotation matrix, a vector, a quaternion, or any other suitable representation. A pose of an object comprising a position and orientation in three dimensions may be represented as a 4×4 matrix of the Lie group SE(3), or using a six-dimensional vector of components corresponding to the Lie algebra se(3) of the Lie group SE(3). It will be appreciated that the matrix representation and the vector representation are related by an invertible exponential map.

To expand on the above, FIG. 1 illustrates an example of a sensor platform in the form of a vehicle 100 travelling along a path 102 through an environment. The vehicle 100 may be an autonomous vehicle or a manually driven vehicle, and includes sensors 104 and a memory 106 configured to store, at least temporarily, data captured using the sensors 104. The sensors 104 may include, for example, LIDAR sensors, radar sensors, sonar sensors, image sensors, inertial sensors, and/or a GPS receiver. The data captured using the sensors 104 is used to determine localization data 108 at a first sequence of time steps and mapping data 110 at a second sequence of time steps, where the second sequence of time steps may have a lower frequency than the first sequence of time steps. As explained above, the mapping data 110 may be independent of the localization data 108, or may be derived from the same sensor measurements as localization data 108 (or a subset thereof). The second sequence of time steps may be a subsequence of the first sequence of time steps, though this is not essential. In FIG. 1, locations 112 at which localization data 108 is determined are represented by filled circles, whereas locations 114 at which both localization data 108 and mapping data 110 are determined are represented by unfilled circles. In the illustrative example of FIG. 1, the frequency at which the localization data 108 is determined is four times the frequency at which the mapping data 110 is determined. In real-life examples, the ratio of frequencies may be significantly higher, for example in the order of tens, hundreds or thousands.

The localization data 108 in this example includes measurements obtained using the sensors 104, from which one or more components of a state of the vehicle 100 may be estimated at a given time step. The state may correspond to the pose of the vehicle 100, or a subset of components of the state may correspond to the pose of the vehicle 100. The localization data 108 in the present example may include, for each time step, estimates of components of the state at given time steps (e.g. measurements derived from different sensors), along with (optionally) odometry measurements linking components of the state between neighboring pairs of time steps. It will be appreciated that in other examples the localization data 108 may include or imply additional measurements, for example measurements linking components of the state between non-neighboring pairs of time steps, such as in the case of a loop closure.

The mapping data 110 in this example includes LIDAR measurements of the environment at time steps of the second sequence of time steps. In other examples, mapping data may additionally or alternatively include other measurements such as radar measurements and/or images of the environment. For a given time step, the LIDAR measurements may include range measurements indicating distances to objects in the vicinity of the vehicle 100, which may be processed (either at the time of capture or at a later time) to generate a point cloud representation of part of the environment at the given time step. The mapping data 110 is arranged so that the resulting point cloud representations of parts of the environment for nearby time steps may be combined using point cloud registration based on estimated poses of the vehicle 100 at those time steps, to generate a map of the environment, for example in the form of a three-dimensional mesh.

In the present example, the vehicle 100 provides the localization data 108 and the mapping data 110 to a remote system 116, for example by transmission over a network (not shown) and/or by a direct connection using wired and/or wireless communication means. The localization data 108 and mapping data 110 may be provided to the remote system 116 in a streaming fashion or in batches, either periodically (such as every hour, day, week etc.) or when certain conditions are satisfied, such as when a suitable wired or wireless connection to the network is available, when a certain volume of data has been generated, and/or in response to user input at the vehicle 100 or the remote system 116. The localization data 108 and/or the mapping data 110 may be processed by a data processing component (not shown) of the vehicle 100 prior to being provided to the remote system 116. For example, LIDAR range measurements may be converted to point cloud representations, though any such processing may alternatively be performed at the remote system 116.

The remote system 116 may include a localization component 118 configured to process the localization data 108 to generate high-frequency trajectory data 120. The high-frequency trajectory data 120 may indicate a joint probability distribution for states of the vehicle 100 at the first sequence of time steps (corresponding to the ground truth locations 112). The localization component 118 may generate the high-frequency trajectory data 120 by solving the factor graph. The localization component 118 may solve the factor graph by performing a filtering and/or smoothing process with a chosen filter. Examples of filters that may be applied include Kalman-type filters (such as a Kalman filter, extended Kalman filter, or unscented Kalman filter), though other filters such as particle filters and Gaussian process-based filters may be employed additionally or as an alternative. Alternatively, or additionally, the localization component 118 may use a smoother to solve the factor graph, such as a Rauch-Tung-Striebel (RTS) smoother, a two-filter smoother, a sequential importance resampling smoother, a Rao-Blackwellized particle smoother, or a grid-based smoother. Optimal smoothing equations are available for all Kalman-type filters, and may be evaluated using a series of recursive calculations in the reverse temporal direction. A smoother may solve a non-linear Bayesian optimization problem to determine a most likely configuration of states of the vehicle over the first sequence of time steps (e.g. the joint probability distribution having the highest likelihood).

The joint probability distribution resulting from solving the factor graph may be characterized by a sparse (block diagonal) information matrix in which entries associating non-neighboring pairs of time steps are zero. It will be appreciated, however, that other factor graphs are possible, for example in cases where an odometry measurement relates poses at non-neighboring time steps, in which case the resulting joint probability distribution may have a different structure.

Figure 2:
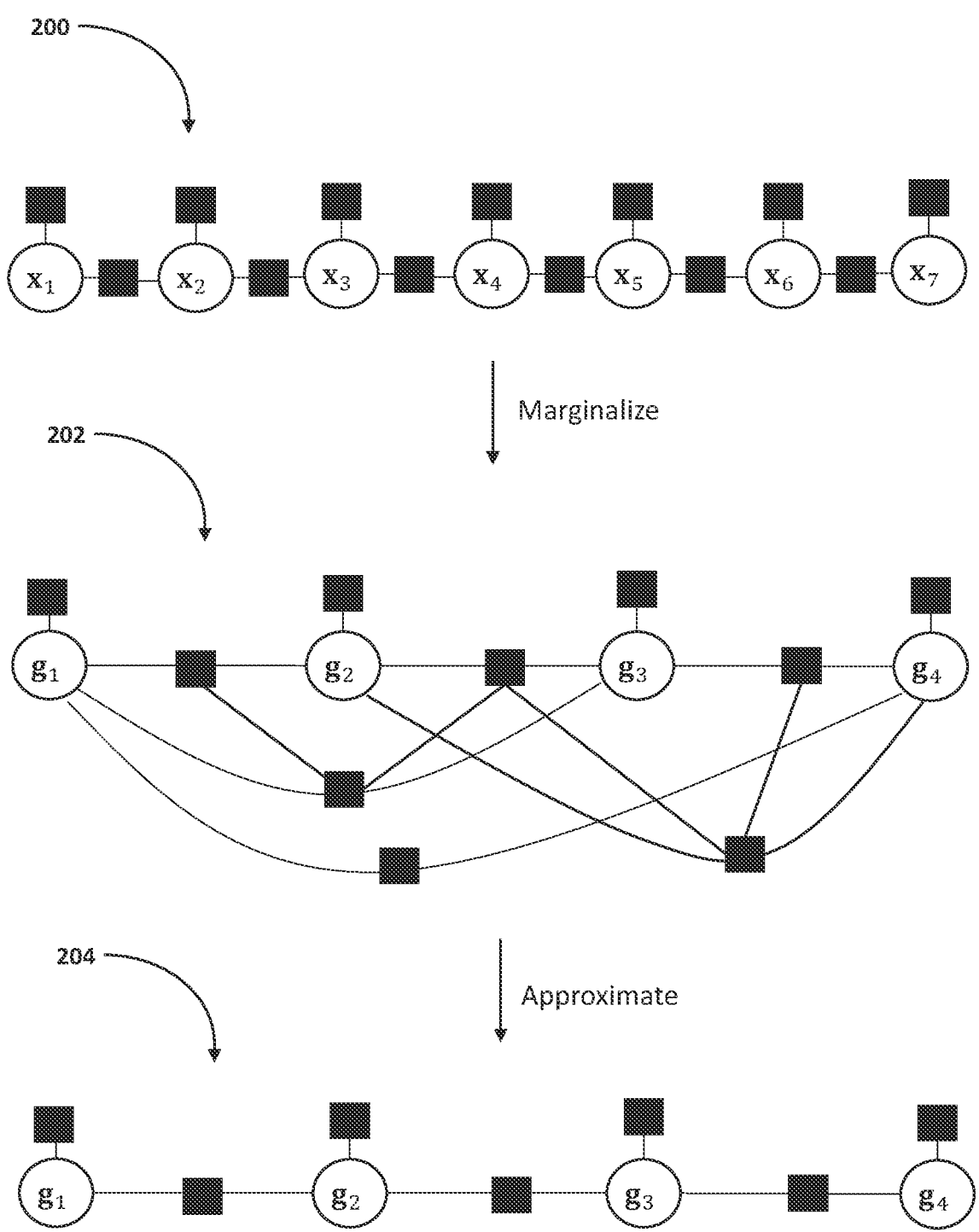
FIG. 2 depicts three factor graphs corresponding to respective probability distributions.

FIG. 2 shows an example of a factor graph 200 representing a joint probability distribution over states $x_1, \ldots, x_7$ of a sensor platform at a first sequency of time steps $t_1, \ldots, t_7$, in which the filled squares represent unary factors encoding probabilistic information relating to measurements of the states, and binary factors encoding probabilistic information relating to odometry measurements between states. According to examples, a point measurement $z_{i,t}$ of a state (or a subset of components of the state) at time step t may be modelled as a noisy observation of the true state $x_t$ at time step t such that $z_{i,t}=g_i(x_t)+v_{i,t}$, where $g_i$ is a measurement operator associated with the $i^{th}$ measurement of the state at time t and $v_{i,t}$ is a measurement noise associated with the $i^{th}$ measurement of the state at time t. An odometry measurement $o_{j,t}$ may be modelled as a noisy observation of a function of the states of the sensor platform at neighboring time steps t and t+1 such that $o_{j,t}=h_j(x_t, x_{t+1})+\tilde{v}_{j,t}$, where $h_j$ is an odometry measurement operator associated with the $j^{th}$ odometry measurement between time steps t and t+1, and $\tilde{v}_{j,t}$ is an odometry measurement noise. The true state $x_t$ at time step t may be modelled as being related to the true state $x_{t+1}$ at the following time step t+1 by application of a linear or nonlinear state transition operator f, such that the operator f represents the time evolution of the state, which is modelled to be subject to state transition noise $w_t$ capturing random (uncorrelated) variations in the system dynamics, such that $x_{t+1}=f(x_t)+w_{t+1}$. In examples, the noise vectors $v_{i,t}$, $\tilde{v}_{j,t}$, $w_t$ may be modelled as multivariate Gaussian noise parameterized by covariance matrices that may be predefined (for example determined by a calibration process) and/or may be optimized as part of the process of solving the factor graph. Solving the factor graph leads to an estimate of the posterior probability distribution $$p\left(x_1, \ldots, x_T \mid \{z_{i,1}\}_{i=1}^{I_1}, \ldots, \{z_{i,T}\}_{i=1}^{I_T}, \{o_{j,1}\}_{j=1}^{J_1}, \ldots \{o_{j,T-1}\}_{j=1}^{J_T}\right)$$

over the states $x_t$ for $t=1, \ldots, T$ given the set of point measurements $z_{i,t}$ for $i=1, \ldots, I_t$, $t=1, \ldots, T$ (where $I_t$ is the number of point measurements taken at time step t, and T is the number of time steps in the first sequence of time steps) and the set of odometry measurements $o_{j,t}$ for $j=1, \ldots, J_t$, $t=1, \ldots, T-1$ (where $J_t$ is the number of odometry measurements taken between time steps t and t+1). It is to be noted that some point measurements and/or some odometry measurements may be omitted for certain time steps or certain pairs of time seps, either by design or as a result of unsuccessful measurement attempts at certain time steps.

Returning to FIG. 1, the remote system 116 includes a downsampling component 122 which is configured to process the high-frequency trajectory data 120 to generate low-frequency trajectory data 124. The low-frequency trajectory data 124 may indicate a joint probability distribution for states of the vehicle 100 at the second sequence of time steps (corresponding to the ground truth locations 114). This joint probability distribution is representable by a factor graph with unary factors at time steps of the second sequence of time steps and binary factors between neighboring pairs of time steps of the second sequence of time steps, and has a block diagonal information matrix in which entries associating non-neighboring pairs of time steps are zero. This joint probability distribution has an equivalent form to that which would be obtained by taking measurements of the poses of the vehicle 100 at the second sequence of time steps and odometry measurements for neighboring pairs of time steps, but advantageously incorporates information from the localization data 116 determined at the higher-frequency first sequence of time steps.

Figure 3:
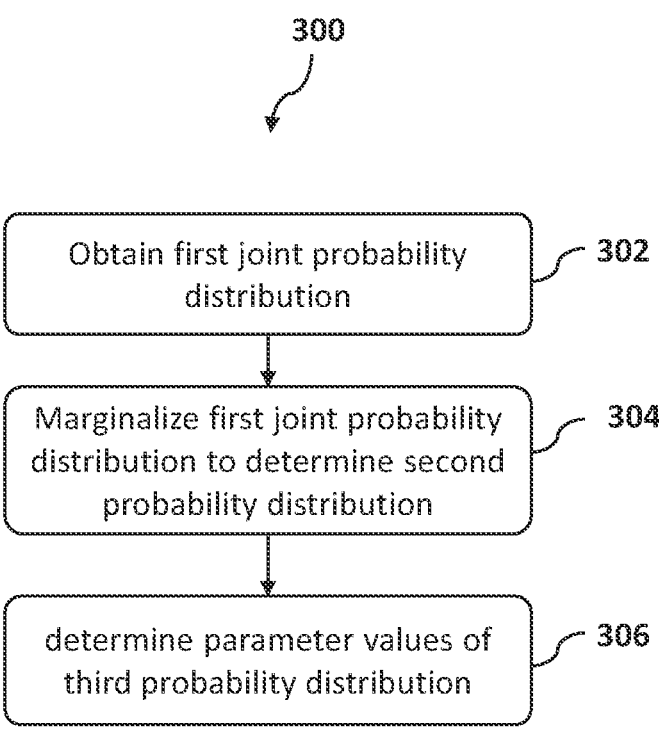
FIG. 3 is a schematic flow diagram representing downsampling a joint probability distribution according to examples.

FIG. 3 shows an example of a method 300 that may be carried out by the downsampling component 122 in accordance with aspects of the present disclosure. The method 300 proceeds with obtaining, at 302, data indicating a first joint probability distribution for states of a sensor platform at time steps of a first sequence of time steps. The first joint probability distribution may for example be representable by a factor graph including unary factors for time steps of the first sequence of time steps, and binary factors for pairs of neighboring time steps of the first sequence of time steps, though other sparsity structures are possible without departing from the scope of the disclosure.

The method 300 continues with marginalizing, at 304, the first joint probability distribution with respect to a plurality of variables to determine a second joint probability distribution for poses of the vehicle at time steps of a second sequence of time steps. Marginalizing the first joint probability distribution with respect to certain variables may involve integrating out those variables from the first joint probability distribution. In particular, the first joint probability distribution may be marginalized with respect to variables defined at time steps not appearing in the second sequence of time steps. The first joint probability distribution may further be marginalized with respect to components of the state vector that are not relevant to the mapping task. For example, the joint probability distribution may be marginalized with respect to the velocity of the sensor platform, as the velocity may not be directly relevant for generating a map of the environment. Other possible variables that may be marginalized out include IMU bias and/or time derivatives of the orientation. As a result, the second joint probability distribution may be defined solely over poses (i.e. positions and/or orientations) of the sensor platform, each of which may only include a subset of components of the original states. In some cases, the marginalizing of 304 may be performed separately for different portions of the first joint probability distribution (e.g. for variables corresponding to subsequences of the first sequence of time steps), which may alleviate memory issues that could otherwise arise for very long sequences of time steps.

In the example of FIG. 2, a first joint probability distribution corresponding to the factor graph 200 is marginalized with respect to states of the sensor platform at even time steps and also with respect to probabilistic variables not defining a pose of the sensor platform. The resulting second joint probability distribution, represented by a new factor graph 202, is defined over poses of the sensor platform (labelled $g_1$, $g_2$, $g_3$, $g_4$). In this example, the frequency of time steps over which the second joint probability distribution is defined at half the frequency of time steps over which the first joint probability distribution is defined.

Unfortunately, the second joint probability distribution resulting from the marginalization of the first probability distribution does not inherit the sparse structure of the first probability distribution, and the information matrix for the second joint probability distribution is generally a dense matrix. The corresponding factor graph is no longer sparsely connected but instead may be fully connected, for example as shown by the additional binary factors in the factor graph 202. It is also possible for the factors to be connected to one another in the factor graph representing the second joint probability distribution, as shown by the lines connecting square boxes in the factor graph 202. In the present context, this loss of sparsity results in a distribution that cannot be described in terms of an interpretable noise model, preventing further measurements (such as mapping data) from being incorporated into the distribution in a principled and tractable manner.

The method 300 continues with determining, at 306, values of a set of parameters of a third probability distribution for states of the sensor platform at time steps of the second sequence of time steps. The values of the set of parameters are determined such that the third joint probability distribution is an approximation of the second joint probability distribution but, unlike the second joint probability distribution, corresponds to a sparsely connected factor graph having unary factors for time steps in the second sequence of time steps and binary factors for pairs of neighboring time steps in the second sequence of time steps. The third joint probability distribution therefore has the same sparsity structure as would result from taking pose measurements at time steps of the second sequence of time steps, and odometry measurements between neighboring pairs of time steps. In the example of FIG. 2, the third joint probability distribution is represented the factor graph 204. It is observed that this factor graph has the same sparsity structure as the original factor graph 200, but with a lower sampling frequency.

The task of approximating a second joint probability distribution of arbitrary form with a third joint probability distribution of a specified form may be approached by minimizing a divergence between the second and third joint probability distribution, for example the Kullback-Leibler (KL) divergence. However, as the number of variables over which the joint probability distribution is defined increases, the computational cost of evaluating and/or directly minimizing the KL divergence via conventional methods (such as Newton-like methods, coordinate descent, gradient descent, conjugate gradient descent, or variants thereof) rapidly increases and the problem quickly becomes intractable. In order to address this issue, the present disclosure provides a novel iterative method that leverages hidden properties of the KL divergence arising from the specified structure of the third joint probability distribution in the present context.

Figure 4:
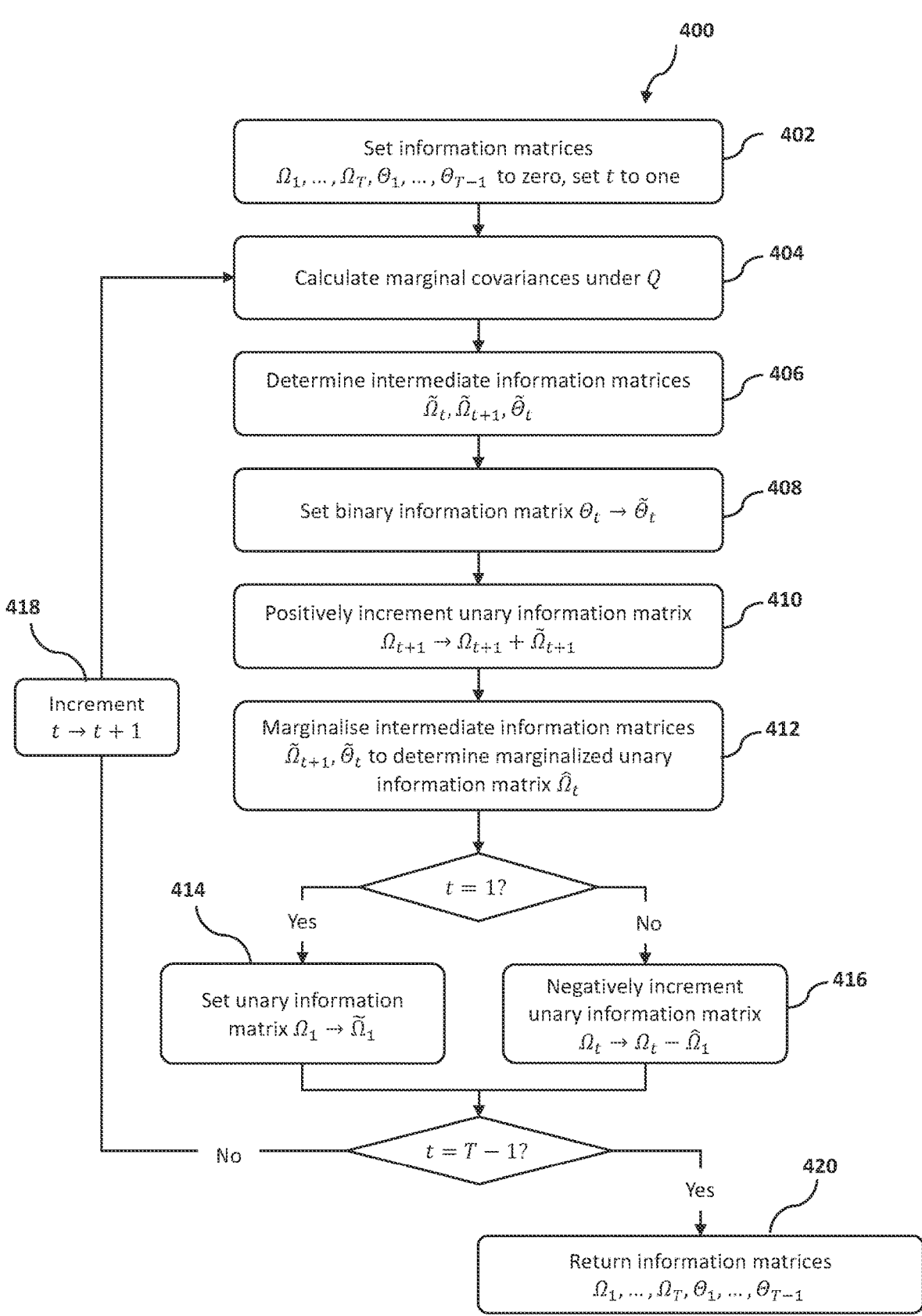
FIG. 4 is a schematic flow diagram representing a method of determining parameter values for a joint probability distribution according to examples.

FIG. 4 shows an example of a flow diagram representing a method 400 that may be used to approximate an arbitrary original joint probability distribution over a sequence of matrix-valued poses $g_1, \ldots, g_T$ (for example matrices in one of the groups SE(2) or SE(3), depending on whether the poses are defined in two or three dimensions), with a sparsified joint probability distribution over the sequence of poses $g_1, \ldots, g_T$ representable by a factor graph having the desired sparsity structure discussed above. In the following paragraphs, the modal values of the poses $g_1, \ldots, g_T$ are denoted $h_1, \ldots, h_T$, and the matrix $$\alpha_t = Ad\left(h_{t+1}^{-1}h_t\right)$$

represents a relative transformation from the modal value of the pose at time step t+1 to the modal value of the pose at the previous time step t. Defining the vector-valued quantity $$X_t = \log h_t^{-1} g_t$$

(in the tangent space of the relevant Lie group), it is observed that the relative pose between neighboring time steps is given by $$g_t^{-1}g_{t+1} = h_t^{-1}h_{t+1}\exp(-\alpha_t X_t)\exp(X_{t+1}) = h_t^{-1}h_{t+1}\left(X_{t+1} - \alpha_t X_t + O(X_t^2)\right).$$

Making use of this observation, the method 400 proceeds to determine parameter values of a sparsified joint probability distribution P over the random pose variables $X_1, \ldots, X_T$, described by Gaussian factors on measurements of $X_t$ and $X_{t+1} - \alpha_t X_t$ that minimizes the KL divergence D(Q∥P), where Q is the joint probability distribution over $X_1, \ldots, X_T$ implied by the original joint probability distribution. Working with the random variables $X_1, \ldots, X_T$ as opposed to the pose matrices $g_1, \ldots, g_T$ amounts to linearizing the problem about the modal poses $h_1, \ldots, h_T$. The variable $X_t$ may be viewed as a vector representation of a deviation of the pose $g_t$ at time step t from the modal pose $h_t$ at time step t. The linear combination $X_{t+1}-\alpha_t X_t$ may be viewed as an incremental change between poses between time steps t and t+1, expressed as deviations from the modal pose $h_{t+1}$ at time step t+1.

The relevant family of joint probability distributions for P is a family of exponential distributions with a specific statistic having components of the form $$X_t X_t^\top$$

and $(X_{t+1}-\alpha_t X_t)(X_{t+1}-\alpha_t X_t)^T$. The probability density of this family of distributions is given by exp $$\left[-\frac{1}{2}\sum_{t=1}^{T} X_t \Omega_t X_t^T - \frac{1}{2}\sum_{t=1}^{T-1}(X_{t+1}-\alpha_t X_t)\Theta_t(X_{t+1}-\alpha_t X_t)^T - A(\Theta, \Omega)\right],$$

where $\Omega_t$ is the information matrix (i.e. inverse covariance matrix) associated with a unary factor at time step t, $\Theta_t$ is the information matrix (i.e. inverse covariance matrix) associated with a binary factor between time steps t and t+1, and $A(\Theta, \Omega)$ is a normalizing factor. Elements of the information matrix $\Omega_t$ encode conditional dependencies between components of the variable $X_t$ given all other components of $X_t$, and elements of the information matrix $\Theta_t$ encode conditional dependencies between components of the variable $X_{t+1}-\alpha_t X_t$ given all other components of $X_{t+1}-\alpha_t X_t$. By contrast, elements of the covariance matrix $$\Omega_t^{-1}$$

encode degrees of dependence between components of the variable $X_t$, and elements of the covariance matrix $$\Theta_t^{-1}$$

encode degrees of dependence between components of the variable $X_{t+1}-\alpha_t X_t$. For convenience, steps of the method 400 are described in terms of the information matrices $\Omega_t$, $\Theta_t$, but could equivalently be stated in terms of the covariance matrices $$\Omega_t^{-1}, \Theta_t^{-1}.$$

Any step in which an information matrix is determined could be replaced with an equivalent step in which a covariance matrix is determined.

In order to determine the parameter values of the sparsified joint probability distribution P, the method 400 makes use of the insight that the KL divergence D(Q‖P) is minimized when the marginal covariances $Cov_P(X_t, X_t)$ and $Cov_P(X_{t+1}-\alpha_t X_t, X_{t+1}-\alpha_t X_t)$ taken under the distribution P are equal to the corresponding marginal covariance $Cov_Q$ $(X_t, X_t)$ and $Cov_Q(X_{t+1}-\alpha_t X_t, X_{t+1}-\alpha_t X_t)$ taken under the distribution Q (providing that the unary and binary factors are all non-singular). An equivalent statement is that the KL divergence is minimized when the expectations $$\mathbb{E}_p(X_t X_t^\top) \text{ and } \mathbb{E}_p((X_{t+1}-\alpha_t X_t)(X_{t+1}-\alpha_t X_t)^\top)$$

of the components of the sufficient statistic taken under the distribution P are equal to the expectations $$\mathbb{E}_Q(X_t X_t^\top) \text{ and } \mathbb{E}_Q((X_{t+1}-\alpha_t X_t)(X_{t+1}-\alpha_t X_t)^\top)$$

of the components of the sufficient statistic taken under the distribution Q.

The method 400 proceeds by setting, at 402, the information matrices $\Omega_1, \ldots, \Omega_T, \Theta_1, \ldots, \Theta_{T-1}$ to zero and setting t=1.

The method 400 continues with calculating, at 404, the marginal covariance matrices $Cov_Q(X_t, X_t)$, $Cov_Q(X_{t+1}, X_{t+1})$, $Cov_Q(X_{t+1}-\alpha_t X_t, X_{t+1}-\alpha_t X_t)$ under the distribution Q.

The method 400 continues with determining, at 406, intermediate information matrices $\tilde{\Omega}_t$, $\tilde{\Omega}_{t+1}$, $\tilde{\Theta}_t$ (or equivalently covariance matrices $$\tilde{\Omega}_t^{-1}, \tilde{\Omega}_{t+1}^{-1}, \tilde{\Theta}_t^{-1})$$

associated with the unary factors at time steps t and t+1 and the binary factor between time steps t and t+1 such that the marginal covariances $Cov_P(X_t, X_t), Cov_P(X_{t+1}, X_{t+1})$, $Cov_P$ $(X_{t+1}-\alpha_t X_t, X_{t+1}-\alpha_t X_t)$ under the distribution P match the corresponding marginal covariances under the distribution Q as calculated at step 404. Since the KL divergence is a differential convex function of its parameters, determining the intermediate information matrices $\tilde{\Omega}_t$, $\tilde{\Omega}_{t+1}$, $\tilde{\Theta}_t$ may be performed using any suitable minimization algorithm, for example Newton-like methods, gradient descent, conjugate gradient descent, or variants thereof. In one example, the intermediate information matrices $\tilde{\Omega}_t$, $\tilde{\Omega}_{t+1}$, $\tilde{\Theta}_t$ are determined using a coordinate descent approach as explained in more detail with reference to FIG. 5.

The method 400 continues with setting, at 408, the binary information matrix $\Theta_t$ between time steps t and t+1 to the be equal to the corresponding intermediate binary information matrix $\tilde{\Theta}_t$.

The method 400 continues with positively incrementing, at 410, the unary information matrix $\Omega_{t+1}$ for time step t+1 by the corresponding intermediate unary information matrix $\tilde{\Omega}_{t+1}$, such that $\Omega_{t+1}\rightarrow\Omega_{t+1}+\tilde{\Omega}_{t+1}$.

The method 400 continues with determining, at 412, a marginalized unary information matrix $\hat{\Omega}_t$ by marginalizing a unary factor with the intermediate unary information matrix $\tilde{\Omega}_{t+1}$ and a binary factor with the intermediate binary information matrix $\tilde{\Theta}_{t+1}$.

For the time step t=1, the method 400 continues with setting, at 414, the unary information matrix $\Omega_1$ to be equal to the intermediate unary information matrix $\tilde{\Omega}_1$ at time step t=1.

For a time step t≠1, the method 400 continues with negatively incrementing, at 416, the unary information matrix $\Omega_t$ at time step t by the unary information matrix $\hat{\Omega}_t$ such that $\Omega_t\rightarrow\Omega_t-\hat{\Omega}_t$.

For time steps t≠T−1, the method 400 continues by incrementing 418 the value of t by one such that t→t+1, and returns to step 404. This procedure continues such that the steps of the method 400 are performed recursively in the order of the time steps t=1, . . . , T−1. When the operations have been performed for time step t=T−1, the method 400 returns 420 the information matrices $\Omega_1, \ldots \Omega_T, \Theta_1, \ldots,$ $\Theta_{T-1}$ that define the joint probability distribution P. The method 400 may optionally include converting the joint probability distribution P over the vectors $X_1, \ldots, X_T$ to a corresponding joint probability distribution over the pose matrices $g_1, \ldots, g_T$. It is to be noted that, in the method 400 the parameters of the joint probability distribution P are determined in a temporal order of the time steps $t=1, \ldots,$ T−1, in other examples the parameters could be determined in a reverse temporal order of the time steps (i.e. in the order $t=T−1, \ldots, 1$).

In certain cases, the method 400 may result in a sparsified joint probability distribution characterized by information matrices that are not positive-definite, so that the marginal covariances between poses are also not positive-definite. Such a distribution is non-physical and furthermore may prevent divergence of optimization algorithms using the distribution, such as when incorporating mapping data as discussed in more detail hereinafter. In practice, this problem can be addressed by thresholding the eigenvalues of the determined information matrices $\Omega_1, \ldots, \Omega_T, \Theta_1, \ldots, \Theta_{T-1}$ at a small positive value. For example, a given information matrix may be diagonalized and its eigenvalues determined, and any non-positive eigenvalue may be replaced with the small positive value before inverting the diagonalization. Other approaches to addressing any lack of positive-definiteness may include finding the closest positive-definite matrix, for example using a projection algorithm.

Figure 5:
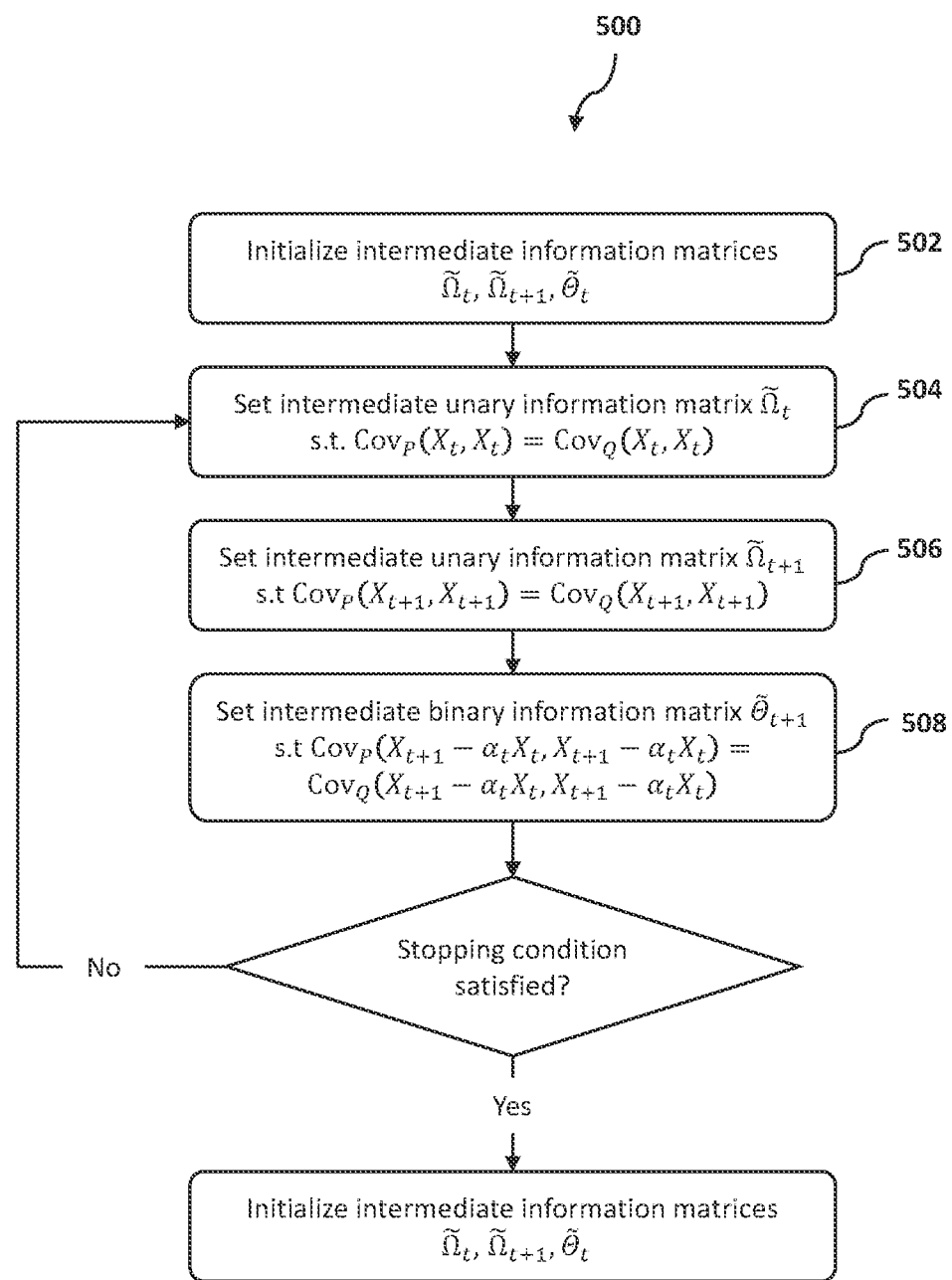
FIG. 5 is a schematic flow diagram representing a method of determining intermediate information matrices according to examples.

The method 400 relies on the ability to determine, for a neighboring pair of time steps t and t+1, intermediate information matrices $\tilde{\Omega}_t, \tilde{\Omega}_{t+1}, \tilde{\Theta}_t$ with the property that they lead to the marginal covariance matrices $\mathrm{Cov}_P(X_t,X_t)$, $\mathrm{Cov}_P(X_{t+1},X_{t+1})$, $\mathrm{Cov}_P(X_{t+1}-\alpha_t X_t, X_{t+1}-\alpha_t X_t)$ under the distribution P matching the corresponding marginal covariances $\mathrm{Cov}_Q(X_t, X_t)$, $\mathrm{Cov}_Q(X_{t+1}, X_{t+1})$, $\mathrm{Cov}_Q(X_{t+1}-\alpha_t X_t, X_{t+1}-\alpha_t X_t)$ under the distribution Q. FIG. 5 illustrates a computationally efficient method 500 for determining the intermediate information matrices $\tilde{\Omega}_t, \tilde{\Omega}_{t+1}, \tilde{\Theta}_t$ using coordinate descent.

The method 500 proceeds with initializing, at 502, the intermediate information matrices $\tilde{\Omega}_t, \tilde{\Omega}_{t+1}, \tilde{\Theta}_t$. The intermediate information matrices may for example be initialized to zero or to an initial guesses, for example with random entries or predetermined entries derived from prior data.

The method 500 continues with setting at 504, the intermediate unary information matrix $\tilde{\Omega}_t$ associated with time step t such that $\mathrm{Cov}_P(X_t,X_t)=\mathrm{Cov}_Q(X_t,X_t)$, while holding the other intermediate information matrices $\tilde{\Omega}_{t+1}, \tilde{\Theta}_t$ constant. Specifically, this involves setting $$\tilde{\Omega}_t = \mathrm{Cov}_Q(X_t, X_t)^{-1} - \alpha_t^\top \tilde{\Theta}_t \alpha_t + \alpha_t^\top \tilde{\Theta}_t (\tilde{\Omega}_{t+1} + \tilde{\Theta}_t)^{-1} \tilde{\Theta}_t \alpha.$$

The method 500 continues with setting at 506, the intermediate unary information matrix $\tilde{\Omega}_{t+1}$ associated with time step t+1 such that $\mathrm{Cov}_P(X_t, X_t)=\mathrm{Cov}_Q(X_t, X_t)$, while holding the other intermediate information matrices $\tilde{\Omega}_t, \tilde{\Theta}_t$ constant. This involves setting $$\tilde{\Omega}_{t+1} = \mathrm{Cov}_Q(X_{t+1}, X_{t+1})^{-1} - \tilde{\Theta}_t + \tilde{\Theta}_t \alpha_t (\tilde{\Omega}_t + \alpha_t^\top \tilde{\Theta}_t \alpha_t)^{-1} \alpha^\top \tilde{\Theta}_t.$$

The method 500 continues with setting at 508, the intermediate binary information matrix $\tilde{\Theta}_t$ such that $\mathrm{Cov}_P(X_{t+1}-$ $\alpha_t X_t, X_{t+1}-\alpha_t X_t)=\mathrm{Cov}_Q(X_{t+1}-\alpha_t X_t, X_{t+1}-\alpha_t X_t)$, while holding the intermediate unary information matrices $\tilde{\Omega}_t, \tilde{\Omega}_{t+1}$ constant. This involves setting $$\tilde{\Theta}_t = \mathrm{Cov}_Q(X_{t+1} - \alpha_t X_t, X_{t+1} - \alpha_t X_t)^{-1} - $$
$$\tilde{\Omega}_{t+1} + \tilde{\Omega}_{t+1}\alpha_t(\tilde{\Omega}_t + \alpha_t^\top \tilde{\Omega}_{t+1}\alpha_t)^{-1}\alpha^\top \tilde{\Omega}_{t+1}.$$

It is to be noted that the updating of the intermediate information matrices according to steps 504-508 may be performed in any order. When all of the intermediate information matrices have been updated, the method 500 returns to step 504 and this procedure continues iteratively until a stopping condition is satisfied, at which point the intermediate information matrices $\tilde{\Omega}_t, \tilde{\Omega}_{t+1}, \tilde{\Theta}_t$ are returned. The stopping condition may be satisfied for example when one or more convergence criteria are satisfied (for example, a metric distance between intermediate information matrices at consecutive iterations being less than a threshold value) and/or when a predetermined number of iterations has been performed.

Returning to FIG. 1, the remote system 116 may include a pose refinement component 126 configured to process the mapping data 110 and the low-frequency trajectory data 124 to determine refined trajectory data 128. The refined trajectory data 128 may indicate estimated poses of the vehicle 100 at the second sequence of time steps (corresponding to the ground truth locations 114) and/or may indicate a refined joint probability distribution for poses of the vehicle 100 at the second sequence of time steps. Determining the refined trajectory data 128 may include determining estimates of the poses of the vehicle 100 at the second sequence of time steps using the mapping data 110, and combining the estimated poses derived from the mapping data 110 with the joint probability distribution indicated by the low-frequency trajectory data 124. This may for example involve solving a new factor graph defined over poses of the vehicle at the second sequence of time steps, in which the joint probability distribution described by the low-frequency trajectory data 124 is provided as a prior distribution, and the estimates of the poses derived from the mapping data 110 are incorporated as additional measurements (along with an appropriate noise model). In this way, the noise model associated with the mapping data and the noise model implied by the low-frequency trajectory data 124 determine, in a principled and tractable manner, a relative weighting to be applied to the pose estimates derived from the localization data 108 and the pose estimates derived from the mapping data 110. Other methods of determining the refined trajectory data 128 are possible, for example calculating a weighted average of the estimated poses derived from the mapping data 110 and the estimated poses indicated by the low-frequency trajectory data 124, in which the weights depend on the noise model associated with the mapping data 110 and the noise model implied by the low-frequency trajectory data 124.

Figure 6:
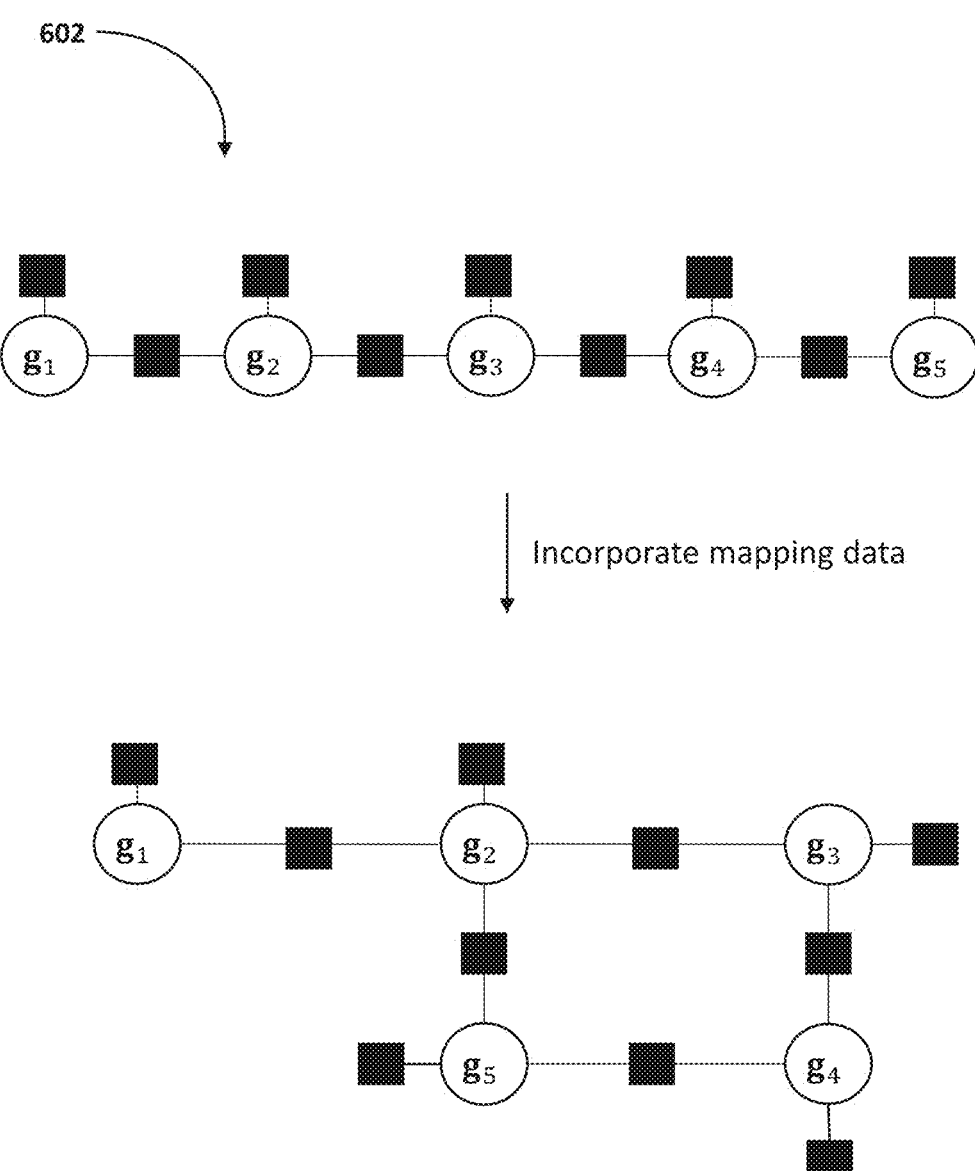
FIG. 6 depicts two factor graphs illustrating detection of a loop closure based on mapping data.

In some examples, the mapping data 110 may be used to detect one or more loop closures in cases where the vehicle 100 revisits part of the environment, implying a new binary factor between poses of the vehicle 100 at non-neighboring time steps, which may be used to reduce uncertainty in the refined trajectory data 128. Various approaches may be used to detect a loop disclosure as will be appreciated by those skilled in the art, for example point cloud registration, image registration, and/or landmark detection. FIG. 6 shows an example of a factor graph 602 representing a joint probability distribution over poses $g_1, \ldots, g_T$ of the vehicle 100 with a sparsity structure as obtained using the methods described herein. The joint probability distribution in this example is conditioned on mapping data 110 resulting in an updated factor graph 602 in which a loop closure has been detected between time steps t=5 and t=2. This updated factor graph may be solved to determine a refined joint probability distribution over poses of the vehicle 100.

The remote system 116 may further include a mapping component 130 configured to process the mapping data 110 and the refined trajectory data 128 to generate a map 132 of the environment. Generating the map 132 may for example include aligning, via point cloud registration, point clouds derived from the mapping data 110 in accordance with the estimated poses of the vehicle 100. Generating the map 132 may further include converting the resulting combined point cloud into a different representation, such as a three-dimensional mesh representation, which may be more compact and suitable for storage and/or processing by an autonomous vehicle. Furthermore, the map 132 may be generated by combining mapping data obtained from multiple sensor platforms, such as multiple mapping vehicles travelling through the environment at the same or different times.

Although in FIG. 1 the pose refinement component 126 and the mapping component 130 are shown as distinct from one another, the functionality of these components may be performed simultaneously using simultaneous localization and mapping (SLAM). Furthermore, operations described as being performed by the remote system 116 may equally be performed by computing components onboard one or more sensor platforms, such as the vehicle 100. Furthermore, although in the examples discussed above the second sequence of time steps is a subsequence of the first sequence of time steps, in other examples the second sequence of time steps may be temporally offset from the first sequence of time steps (for example if exact synchronization between measurements is not possible or otherwise not performed). In such cases, an intermediate up-sampling step may be carried out in which additional factors associated with the second sequence of time steps are determined by interpolation (for example using the exponential map). Following this up-sampling step, the second sequence of time steps is a subsequence of the first sequence of time steps and the method can proceed as described above.

Figure 7:
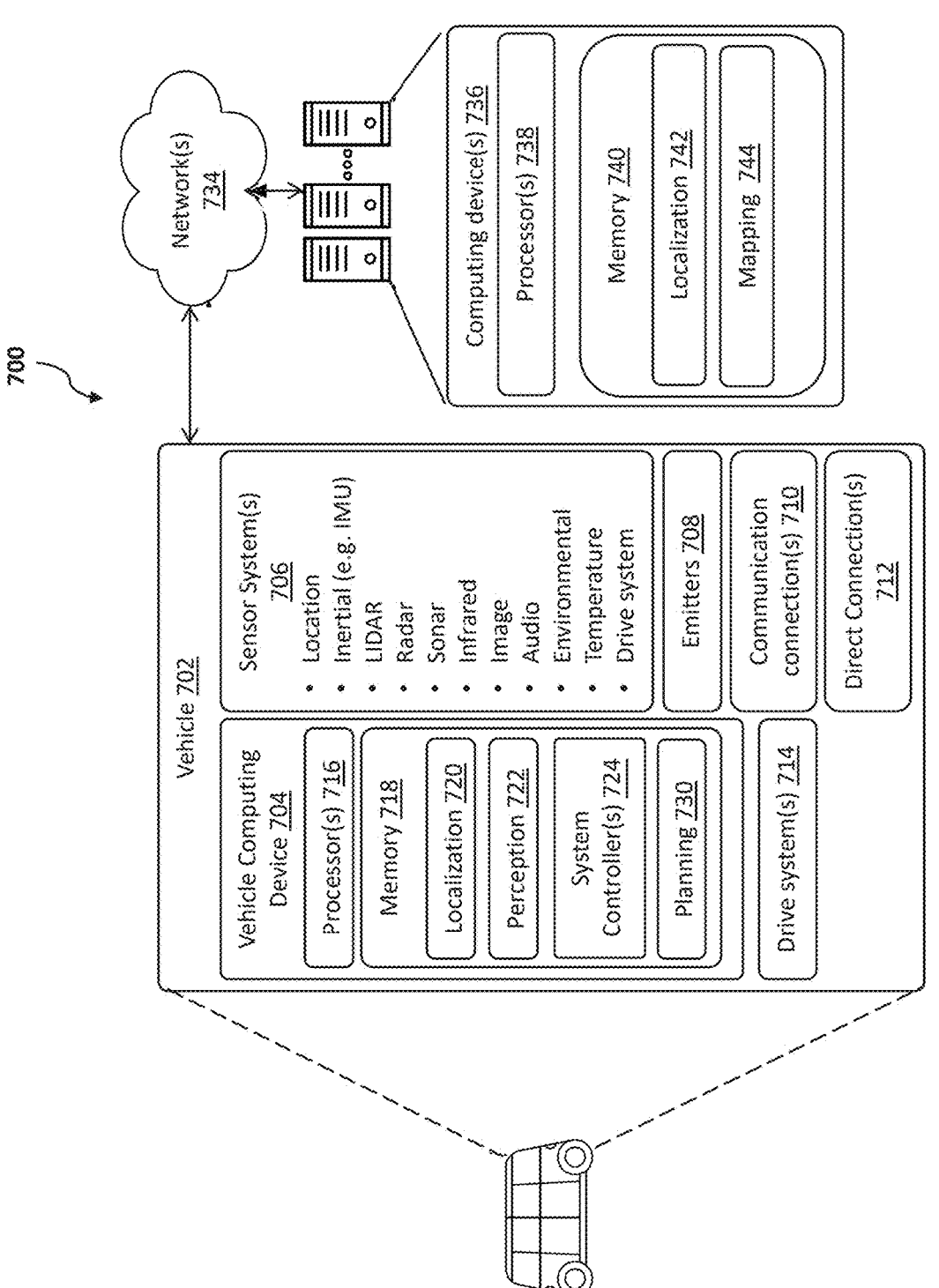
FIG. 7 depicts a schematic block diagram of an example system for implementing the techniques described herein.

FIG. 7 depicts a block diagram of an example system 700 for implementing the techniques described herein. In some instances, the system 700 may include a vehicle 702, which may correspond to the vehicle 100 of FIG. 1. In some instances, the vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 702 may be a fully or partially autonomous vehicle having any other level or classification. Moreover, in some instances, the techniques described herein may be usable by non-autonomous vehicles as well.

The vehicle 702 can include vehicle computing device(s) 704, one or more sensor systems 706, one or more emitters 708, one or more communication connections 710, at least one direct connection 712 (e.g., for physically coupling the vehicle 702 to exchange data and/or to provide power), and one or more drive systems 714.

In some instances, the sensor(s) 706 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 706 may include multiple instances of each of these or other types of sensors. For instance, the LIDAR sensors may include individual LIDAR sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704.

The vehicle 702 may also include the emitter(s) 708 for emitting light and/or sound, as described above. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include the communication connection(s) 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 708 may additionally or alternatively allow the vehicle 702 to communicate with other nearby computing device(s) (e.g., other nearby vehicles, traffic signals, etc.). The communication connection(s) 710 may additionally or alternatively enable the vehicle 702 to communicate with a computing device 736, which may correspond to the remote system 116 of FIG. 1.

The vehicle computing device(s) 704 can include one or more processors 716 and memory 718 communicatively coupled with the one or more processors 716. In the illustrated example, the memory 718 of the vehicle computing device(s) 704 stores a localization component 720, a perception component 722, one or more system controllers 724, and a planning component 730. Though depicted in FIG. 3 as residing in memory 718 for illustrative purposes, it is contemplated that the localization component 720, the perception component 722, the one or more system controllers 724, and/or the planning component 730 may additionally, or alternatively, be accessible to the vehicle 702 (e.g., stored remotely).

In some instances, the perception component 722 can include functionality to perform object detection, semantic segmentation, instance segmentation, and/or classification. In some examples, the perception component 722 can generate processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In at least one example, the vehicle computing device(s) 704 can include one or more system controllers 724, which can be configured to control steering, propulsion, braking, safety, emitters, communication, and other systems of the vehicle 702. The system controller(s) 724 can communicate with and/or control corresponding systems of the drive system(s) 714 and/or other components of the vehicle 702.

The system controller(s) 724 may be communicatively coupled to one or more sensors of the vehicle sensor system(s) 706. By way of non-limiting example, the sensors may detect the presence of objects in the environment of the vehicle and/or determine attributes of those objects. The system controller(s) 724 may also cause activation of a safety system of the vehicle 702 when it is determined that the safety system should be activated. For example, the system controller(s) 724 may instruct an airbag control unit to deploy one or more airbags, or may send a signal to a tensioner arranged to adjust tensioning of one or more restraints. Other safety systems are known and may be activated. In other embodiments, the system controller 724 may instruct activation of multiple safety systems. In some embodiments, some or all functionality of the system controller 724 may be performed remote from the vehicle 702, e.g., at a remote server associated with a dispatch or headquarters for the vehicle 702 or in the cloud. In other implementations, some or all of the functionality of the system controller(s) 724 may be performed at the vehicle 702 to minimize any delay that could result from transmission of data between locales.

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive system with one or more other local or remote computing device(s).

In some examples, the vehicle 702 can send operational data, including raw or processed sensor data from the sensor system(s) 706, to one or more computing device(s) 736 via the network(s) 734. In other examples, the vehicle 702 can send processed operational data and/or representations of operational data to the computing device(s) 736 at a particular frequency, after a lapse of a predetermined period of time, in near real-time, etc. In some cases, the vehicle 702 can send raw or processed operational data to the computing device(s) 736 as one or more log files.

The one or more computing device(s) 736 can include one or more processors 738 and memory 740 communicatively coupled with the one or more processors 738. The memory 740 may store one or more computer programs for carrying out processes described herein. The program may be in the form of non-transitory source code, object code, a code intermediate source and object code such as in partially compiled form, or in any other non-transitory form suitable for use in the implementation of processes according to the disclosure. The computing device(s) may and may include one or more standalone or distributed servers, and/or may be implemented at least partially using cloud computing resources such as Amazon® Web Services (AWS) cloud computing resources. In particular, the computing device(s) 736 can include an offline localization component 742 for processing data obtained using the sensor(s) 706 to estimate positions and/or orientations of the vehicle 702, and a mapping component 744 for processing data obtained using the sensor(s) 706 to generate maps of the environment. The offline localization component 742 and the mapping component 744 may interact to determine refined estimates of the positions and/or orientations of the vehicle 702 in accordance with the techniques described in the present disclosure.

In some instances, aspects of some or all of the components discussed herein may include any models, algorithms, and/or machine learning algorithms. For example, some of the component(s) in the memory 718 may be implemented as a neural network. As can be understood in the context of this disclosure, a neural network may be trained using machine learning in which values of parameters of the network may be determined automatically from data during a training process, rather than being explicitly programmed by a human programmer.

In addition to the systems and methods described herein, the present disclosure extends to computer programs, particularly computer programs on or in an apparatus, adapted for putting the disclosure into practice. The apparatus may be any entity or device capable of carrying the program, for example a storage medium such as a solid-state drive (SSD) or other semiconductor-based RAM; a ROM; a magnetic recording medium; optical memory device; etc.

EXAMPLE CLAUSES

A: A system comprising: one or more processors; and one or more computer-readable media storing computer-executable instructions which, when executed by the one or more processors, cause the one or more processors to perform operations comprising: determining a first joint probability distribution over states of a vehicle, the first joint probability distribution associated with a first sequence of time steps; receiving lidar measurements associated with a second sequence of time steps; integrating out variables from the first joint probability distribution to determine a second joint probability distribution over poses of the vehicle, the second joint probability distribution associated with the second sequence of time steps; determining, using the second joint probability distribution, parameters of a third joint probability distribution over the poses of the vehicle, the third joint probability distribution being an approximation of the second probability distribution and characterized by unary factors for time steps of the second sequence of time steps and binary factors for pairs of neighboring time steps of the second sequence of time steps; and based at least in part on the lidar measurements and the third joint probability distribution: estimating poses of the vehicle associated with the second sequence of time steps; and generating a map of an environment.

B: The system of clause A, wherein determining the parameters of the third probability distribution is performed recursively in a temporal order of the second sequence of time steps or a reverse temporal order of the second sequence of time steps.

C: The system of clause A or B, wherein determining the parameters of the third probability distribution comprises, recursively in a temporal order of the second sequence of time steps or a reverse temporal order of the second sequence of time steps: determining intermediate covariance matrices associated with the unary factors and binary factor for two subsequent poses of the vehicle to equate marginal covariances of the two poses under the third joint probability distribution with marginal covariances of the two poses under the second joint probability distribution, and to equate a marginal covariance of an incremental change between the two poses under the third joint probability distribution with a marginal covariance of an incremental change between the two poses under the second joint probability distribution; setting a covariance matrix associated with the binary factor for the two poses to the intermediate covariance matrix associated with the binary factor for the two poses; incrementing an inverse covariance matrix associated with the unary factor for a first pose of the two poses by an inverse of the intermediate covariance matrix associated with the unary factor for the first pose of the two poses; determining a unary covariance matrix by marginalizing the binary factor for the two poses and the unary factor for a second pose of the two poses; and decrementing an inverse covariance matrix associated with the unary factor for the first pose of the two poses by an inverse of the unary covariance matrix D: The system of clause A, B or C, comprising transmitting the generated map to an autonomous vehicle.

E: A method comprising: determining a first joint probability distribution over states of a sensor platform, the first joint probability distribution associated with a first sequence of time steps; receiving sensor data indicating measurements, by a sensor system onboard the sensor platform, at time steps of a second sequence of time steps; integrating out variables from the first joint probability distribution to determine a second joint probability distribution over poses of the sensor platform, the second joint probability distribution associated with a second sequence of time steps; determining, using the second joint probability distribution, parameters of a third joint probability distribution over poses of the sensor platform, the third joint probability distribution being an approximation of the second joint probability and characterized by unary factors for time steps of the second sequence of time steps and binary factors for pairs of neighboring time steps of the second sequence of time steps; and estimating, based at least in part on the sensor data and the third joint probability distribution, poses of the sensor platform associated with the second sequence of time steps.

F: The method of cause E, wherein determining the parameters of the third joint probability distribution is performed recursively in a temporal order of the second sequence of time steps or a reverse temporal order of the second sequence of time steps.

G: The method of clause E or F, wherein determining the parameters of the third probability distribution comprises, recursively in a temporal order of the second sequence of time steps or a reverse temporal order of the second sequence of time steps: determining intermediate covariance matrices associated with the unary factors and binary factor for two subsequent poses of the vehicle to equate marginal covariances of the two poses under the third joint probability distribution with marginal covariances of the two poses under the second joint probability distribution, and to equate a marginal covariance of an incremental change between the two poses under the third joint probability distribution with a marginal covariance of an incremental change between the two poses under the second joint probability distribution; setting a covariance matrix associated with the binary factor for the two poses to the intermediate covariance matrix associated with the binary factor for the two poses; incrementing an inverse covariance matrix associated with the unary factor for a first pose of the two poses by an inverse of the intermediate covariance matrix associated with the unary factor for the first pose of the two poses; determining a unary covariance matrix by marginalizing the binary factor for the two poses and the unary factor for a second pose of the two poses; and decrementing an inverse covariance matrix associated with the unary factor for the first pose of the two poses by an inverse of the unary covariance matrix.

H: The computer-implemented method of clause G, wherein determining the intermediate covariance matrices comprises performing a coordinate descent.

I: The method of clause G or H, further comprising: identifying a determined covariance matrix as having a negative eigenvalue; and replacing the identified covariance matrix with a matrix having only positive eigenvalues.

J: The method of any of clauses E to I, wherein the sensor system comprises a lidar sensor and the obtained sensor data indicates measurements obtained using the lidar sensor.

K: The method of any of clauses E to J, comprising: generating, based at least in part on the sensor data and the third joint probability distribution, a map of the environment; and transmitting the map of the environment to an autonomous vehicle.

L: The method of any of clauses E to K, wherein estimating the poses of the sensor platform associated with the second sequence of time steps comprises: identifying, using the sensor data, a loop closure associated with two time steps of the second sequence of time steps; and updating the third joint probability distribution based on the identified loop closure.

M: The method of any of clauses E to L, wherein the second sequence of time steps has a lower frequency than the first sequence of time steps.

N: The method of any of clauses E to M, wherein the determining the first joint probability distribution comprises processing measurements obtained using the sensor system using one or more of a filter or a smoother.

O: One or more non-transitory computer-readable media storing instructions executable by one or more processors, wherein the instructions, when executed, cause the one or more processors to perform operations comprising: determining a first joint probability distribution over states of a sensor platform, the first joint probability distribution associated with a first sequence of time steps; receiving sensor data indicating measurements, by a sensor system onboard the sensor platform, at time steps of a second sequence of time steps; integrating out variables from the first joint probability distribution to determine a second joint probability distribution over poses of the sensor platform, the second joint probability distribution associated with a second sequence of time steps; determining, using the second joint probability distribution, parameters of a third joint probability distribution over poses of the sensor platform, the third joint probability distribution being an approximation of the second joint probability and characterized by unary factors for time steps of the second sequence of time steps and binary factors for pairs of neighboring time steps of the second sequence of time steps; and estimating, based at least in part on the sensor data and the third joint probability distribution, poses of the sensor platform associated with the second sequence of time steps.

P: The one or more non-transitory computer-readable media of clause O, wherein determining the parameters of the third probability distribution is performed recursively in a temporal order of the second sequence of time steps or a reverse temporal order of the second sequence of time steps.

Q: The one or more non-transitory computer-readable media of clause O or P, wherein determining the parameters of the third probability distribution comprises, recursively in a temporal order of the second sequence of time steps or a reverse temporal order of the second sequence of time steps: determining intermediate covariance matrices associated with the unary factors and binary factor for two subsequent poses of the vehicle to equate marginal covariances of the two poses under the third joint probability distribution with marginal covariances of the two poses under the second joint probability distribution, and to equate a marginal covariance of an incremental change between the two poses under the third joint probability distribution with a marginal covariance of an incremental change between the two poses under the second joint probability distribution; setting a covariance matrix associated with the binary factor for the two poses to the intermediate covariance matrix associated with the binary factor for the two poses; incrementing an inverse covariance matrix associated with the unary factor for a first pose of the two poses by an inverse of the intermediate covariance matrix associated with the unary factor for the first pose of the two poses; determining a unary covariance matrix by marginalizing the binary factor for the two poses and the unary factor for a second pose of the two poses; and decrementing an inverse covariance matrix associated with the unary factor for the first pose of the two poses by an inverse of the unary covariance matrix.

R: The one or more non-transitory computer-readable media of any of clauses O to Q, wherein determining the intermediate covariance matrices comprises performing a coordinate descent.

S: The one or more non-transitory computer-readable media of any of clauses O to R, wherein the operations comprise: generating, based at least in part on the sensor data and the third joint probability distribution, a map of the environment; and transmitting the map of the environment to an autonomous vehicle.

T: The one or more non-transitory computer-readable media any of clauses O to S, wherein estimating the poses of the sensor platform associated with the second sequence of time steps comprises: identifying, using the sensor data, a loop closure associated with two time steps of the second sequence of time steps; and updating the third joint probability distribution based on the identified loop closure.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:
one or more processors; and
one or more non-transitory computer-readable media storing computer-executable instructions which, when executed by the one or more processors, cause the one or more processors to perform operations comprising:
determining a first joint probability distribution over states of a first vehicle, the first joint probability distribution associated with a first sequence of time steps;
receiving lidar measurements associated with a second sequence of time steps;
integrating out variables from the first joint probability distribution to determine a second joint probability distribution over poses of the first vehicle, the second joint probability distribution associated with the second sequence of time steps;
determining, using the second joint probability distribution, parameters of a third joint probability distribution over the poses of the first vehicle, the third joint probability distribution being an approximation of the second joint probability distribution and characterized by unary factors for time steps of the second sequence of time steps and binary factors for pairs of neighboring time steps of the second sequence of time steps, determining the parameters of the third joint probability distribution comprising, recursively in a temporal order of the second sequence of time steps or a reverse temporal order of the second sequence of time steps:
determining intermediate covariance matrices associated with the unary factors and binary factor for two subsequent poses of the first vehicle to equate marginal covariances of the two subsequent poses under the third joint probability distribution with marginal covariances of the two subsequent poses under the second joint probability distribution, and to equate a marginal covariance of an incremental chance between the two subsequent poses under the third joint probability distribution with a marginal covariance of an incremental change between the two subsequent poses under the second joint probability distribution;
setting a covariance matrix associated with the binary factor for the two subsequent poses to the intermediate covariance matrix associated with the binary factor for the two subsequent poses;
incrementing an inverse covariance matrix associated with the unary factor for a first pose of the two subsequent poses by an inverse of the intermediate covariance matrix associated with the unary factor for the first pose of the two subsequent poses;

determining a unary covariance matrix by marginalizing the binary factor for the two subsequent poses and the unary factor for a second pose of the two subsequent poses; and decrementing an inverse covariance matrix associated with the unary factor for the first pose of the two subsequent poses by an inverse of the unary covariance matrix;

based at least in part on the lidar measurements and the third joint probability distribution:

estimating poses of the first vehicle associated with the second sequence of time steps; and generating a map of an environment; and transmitting the generated map to a second vehicle, wherein the second vehicle is an autonomous vehicle configured to be controlled to navigate through the environment based at least in part on the generated map.

2. The system of claim 1, wherein determining the parameters of the third joint probability distribution is performed recursively in a temporal order of the second sequence of time steps or a reverse temporal order of the second sequence of time steps.

3. A method comprising:

determining a first joint probability distribution over states of a sensor platform comprising a first vehicle, the first joint probability distribution associated with a first sequence of time steps;

receiving sensor data indicating measurements, by a sensor system onboard the sensor platform, at time steps of a second sequence of time steps;

integrating out variables from the first joint probability distribution to determine a second joint probability distribution over poses of the sensor platform, the second joint probability distribution associated with the second sequence of time steps;

determining, using the second joint probability distribution, parameters of a third joint probability distribution over poses of the sensor platform, the third joint probability distribution being an approximation of the second joint probability distribution and characterized by unary factors for time steps of the second sequence of time steps and binary factors for pairs of neighboring time steps of the second sequence of time steps, determining the parameters of the third joint probability distribution comprising, recursively in a temporal order of the second sequence of time steps or a reverse temporal order of the second sequence of time steps:

determining intermediate covariance matrices associated with the unary factors and binary factor for two subsequent poses of the sensor platform to equate marginal covariances of the two subsequent poses under the third joint probability distribution with marginal covariances of the two subsequent poses under the second joint probability distribution, and to equate a marginal covariance of an incremental change between the two subsequent poses under the third joint probability distribution with a marginal covariance of an incremental change between the two subsequent poses under the second joint probability distribution;

setting a covariance matrix associated with the binary factor for the two subsequent poses to the intermediate covariance matrix associated with the binary factor for the two subsequent poses;

incrementing an inverse covariance matrix associated with the unary factor for a first pose of the two subsequent poses by an inverse of the intermediate covariance matrix associated with the unary factor for the first pose of the two subsequent poses;

determining a unary covariance matrix by marginalizing the binary factor for the two subsequent poses and the unary factor for a second pose of the two subsequent poses; and decrementing an inverse covariance matrix associated with the unary factor for the first pose of the two subsequent poses by an inverse of the unary covariance matrix;

estimating, based at least in part on the sensor data and the third joint probability distribution, poses of the sensor platform associated with the second sequence of time steps;

generating, based at least in part on the sensor data and the third joint probability distribution, a map of an environment; and transmitting the map of the environment to a second vehicle, wherein the second vehicle is configured to be controlled to navigate through the environment based at least in part on the map.

4. The method of claim 3, wherein determining the parameters of the third joint probability distribution is performed recursively in a temporal order of the second sequence of time steps or a reverse temporal order of the second sequence of time steps.

5. The method of claim 3, wherein determining the intermediate covariance matrices comprises performing a coordinate descent.

6. The method of claim 3, further comprising:

identifying a determined covariance matrix as having a negative eigenvalue; and replacing the identified covariance matrix with a matrix having only positive eigenvalues.

7. The method of claim 3, wherein the sensor system comprises a lidar sensor and the obtained sensor data indicates measurements obtained using the lidar sensor.

8. The method of claim 3, wherein estimating the poses of the sensor platform associated with the second sequence of time steps comprises:

identifying, using the sensor data, a loop closure associated with two time steps of the second sequence of time steps; and updating the third joint probability distribution based on the identified loop closure.

9. The method of claim 3, wherein the second sequence of time steps has a lower frequency than the first sequence of time steps.

10. The method of claim 3, wherein the determining the first joint probability distribution comprises processing measurements obtained using the sensor system using one or more of a filter or a smoother.

11. One or more non-transitory computer-readable media storing instructions executable by one or more processors, wherein the instructions, when executed, cause the one or more processors to perform operations comprising:

determining a first joint probability distribution over states of a sensor platform, the first joint probability distribution associated with a first sequence of time steps;

receiving sensor data indicating measurements, by a sensor system onboard the sensor platform, at time steps of a second sequence of time steps;

integrating out variables from the first joint probability distribution to determine a second joint probability distribution over poses of the sensor platform, the second joint probability distribution associated with the second sequence of time steps;

determining, using the second joint probability distribution, parameters of a third joint probability distribution over poses of the sensor platform, the third joint probability distribution being an approximation of the second joint probability distribution and characterized by unary factors for time steps of the second sequence of time steps and binary factors for pairs of neighboring time steps of the second sequence of time steps, determining the parameters of the third joint probability distribution comprising, recursively in a temporal order of the second sequence of time steps or a reverse temporal order of the second sequence of time steps:

determining intermediate covariance matrices associated with the unary factors and binary factor for two subsequent poses of the sensor platform to equate marginal covariances of the two subsequent poses under the third joint probability distribution with marginal covariances of the two subsequent poses under the second joint probability distribution, and to equate a marginal covariance of an incremental change between the two subsequent poses under the third joint probability distribution with a marginal covariance of an incremental change between the two subsequent poses under the second joint probability distribution;

setting a covariance matrix associated with the binary factor for the two subsequent poses to the intermediate covariance matrix associated with the binary factor for the two subsequent poses;

incrementing an inverse covariance matrix associated with the unary factor for a first pose of the two subsequent poses by an inverse of the intermediate covariance matrix associated with the unary factor for the first pose of the two subsequent poses;

determining a unary covariance matrix by marginalizing the binary factor for the two subsequent poses and the unary factor for a second pose of the two subsequent poses; and decrementing an inverse covariance matrix associated with the unary factor for the first pose of the two subsequent poses by an inverse of the unary covariance matrix;

estimating, based at least in part on the sensor data and the third joint probability distribution, poses of the sensor platform associated with the second sequence of time steps;

generating, based at least in part on the sensor data and the third joint probability distribution, a map of an environment; and transmitting the map of the environment to a vehicle, wherein the vehicle is configured to be controlled to navigate through the environment based at least in part on the map.

\* \* \* \* \*